(12) United States Patent
Pfeiffer

(10) Patent No.: US 10,875,715 B1
(45) Date of Patent: Dec. 29, 2020

(54) INTERLOCKING PART TRANSFER CASSETTES

(71) Applicant: Toyota Motor Engineering & Manufacturing North America, Inc., Plano, TX (US)

(72) Inventor: Randy L. Pfeiffer, Dexter, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/445,987

(22) Filed: Jun. 19, 2019

(51) Int. Cl.
B65G 17/12 (2006.01)
B65G 17/14 (2006.01)

(52) U.S. Cl.
CPC .................... B65G 17/12 (2013.01)

(58) Field of Classification Search
None
See application file for complete search history.

(56) References Cited

U.S. PATENT DOCUMENTS

| 4,981,408 | A | | 1/1991 | Hughes et al. | |
|---|---|---|---|---|---|
| 6,047,813 | A | * | 4/2000 | Herzog | B65G 17/002 198/465.3 |
| 6,464,066 | B2 | * | 10/2002 | Bethke | B65G 17/002 198/465.1 |
| 7,604,448 | B2 | * | 10/2009 | Balk | B65G 17/14 198/465.2 |
| 7,762,387 | B2 | | 7/2010 | Dunn | |
| 9,533,830 | B2 | * | 1/2017 | Lingenhoel | B65G 17/34 |
| 2007/0101567 | A1 | | 5/2007 | Suda et al. | |
| 2010/0300841 | A1 | | 12/2010 | O'Brien | |

FOREIGN PATENT DOCUMENTS

| CN | 101323394 B | 7/2012 |
|---|---|---|
| CN | 206068757 U | 4/2017 |

* cited by examiner

Primary Examiner — Kavel Singh
(74) Attorney, Agent, or Firm — Dinsmore & Shohl LLP

(57) ABSTRACT

A transfer cassette including a base plate, an interlock assembly, a securement plate, and a plate tab. The interlock assembly is arranged on a first edge of the base plate and includes a support arranged on the base plate and a locking finger rotatably arranged on the support. The securement plate is arranged on a second edge of the base plate, opposite the first edge. The plate tab is partially secured to and extending from the base plate.

13 Claims, 4 Drawing Sheets

INTERLOCKING PART TRANSFER CASSETTES

TECHNICAL FIELD

The present specification generally relates to interlocking part transfer cassettes and, more specifically, to interlocking part transfer cassettes that can support adjacent part transfer cassettes while being moved across conveyors and gaps.

BACKGROUND

Part transfer cassettes may be used for carrying parts for assembly, such as vehicle door sub-assemblies. However, these part transfer cassettes can be relatively narrow, particularly with the parts carried thereon, and therefore, may be unstable and present difficulty to transfer between conveyors or between a conveyor and a dolly. Accordingly, additional mechanisms, such as guide rollers, may be used to reduce a gap formed between the conveyors and the dollies to facilitate transfer of the cassettes between dollies and conveyors. The addition of these mechanisms, such as guide rollers can add to the complexity and cost of the system. If such a gap is not reduced, a part transfer cassette may fall over due to a narrow design, or become stalled within the gap during a transfer.

Accordingly, there is a need for interlocking transfer cassettes that can be supported without the need of additional components that can inhibit stalling during a transfer.

SUMMARY

In one embodiment, a transfer cassette includes a base plate, an interlock assembly, a securement plate, and a plate tab. The interlock assembly is on a first edge of the base plate and includes a support on the base plate and a locking finger rotatably arranged on the support. The securement plate is on a second edge of the base plate, opposite the first edge. The plate tab is partially secured to and extends from the base plate.

In another embodiment, a transfer cassette assembly includes a first transfer cassette and a second transfer cassette. The first transfer cassette includes a first base plate, a first interlock assembly, and a first securement plate on the first base plate. The first interlock assembly includes a first support on the first base plate, and a first locking finger rotatably on the first support. The second transfer cassette includes a second base plate, a second interlock, and a second securement plate on the second base plate. The second interlock assembly includes a second support on the second base plate, and a second locking finger rotatably arranged on the second support. The first transfer cassette is adjacent to the second transfer cassette, and the first locking finger engages with the second securement plate to couple the first transfer cassette to the second transfer cassette and inhibit rotation of the second transfer cassette relative to the first transfer cassette.

In another embodiment, a conveyor system includes a conveyor and a transfer cassette assembly arranged on the conveyor. The transfer cassette assembly includes a first transfer cassette and a second transfer cassette. The first transfer cassette includes a first base plate having a first cut-out, a first interlock assembly adjacent to the first cut-out of the first base plate, and a first securement plate on the first base plate. The first interlock assembly includes a first support on the first base plate, and a first locking finger rotatably on the first support. The second transfer cassette includes a second base plate having a second cut-out, a second interlock assembly adjacent to the second cut-out of the second base plate, and a second securement plate on the second base plate. The second interlock assembly includes a second support on the second base plate, and a second locking finger rotatably arranged on the second support. The first transfer cassette is adjacent to the second transfer cassette, and the first locking finger engages with the second securement plate to couple the first transfer cassette to the second transfer cassette and inhibit rotation of the second transfer cassette relative to the first transfer cassette.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
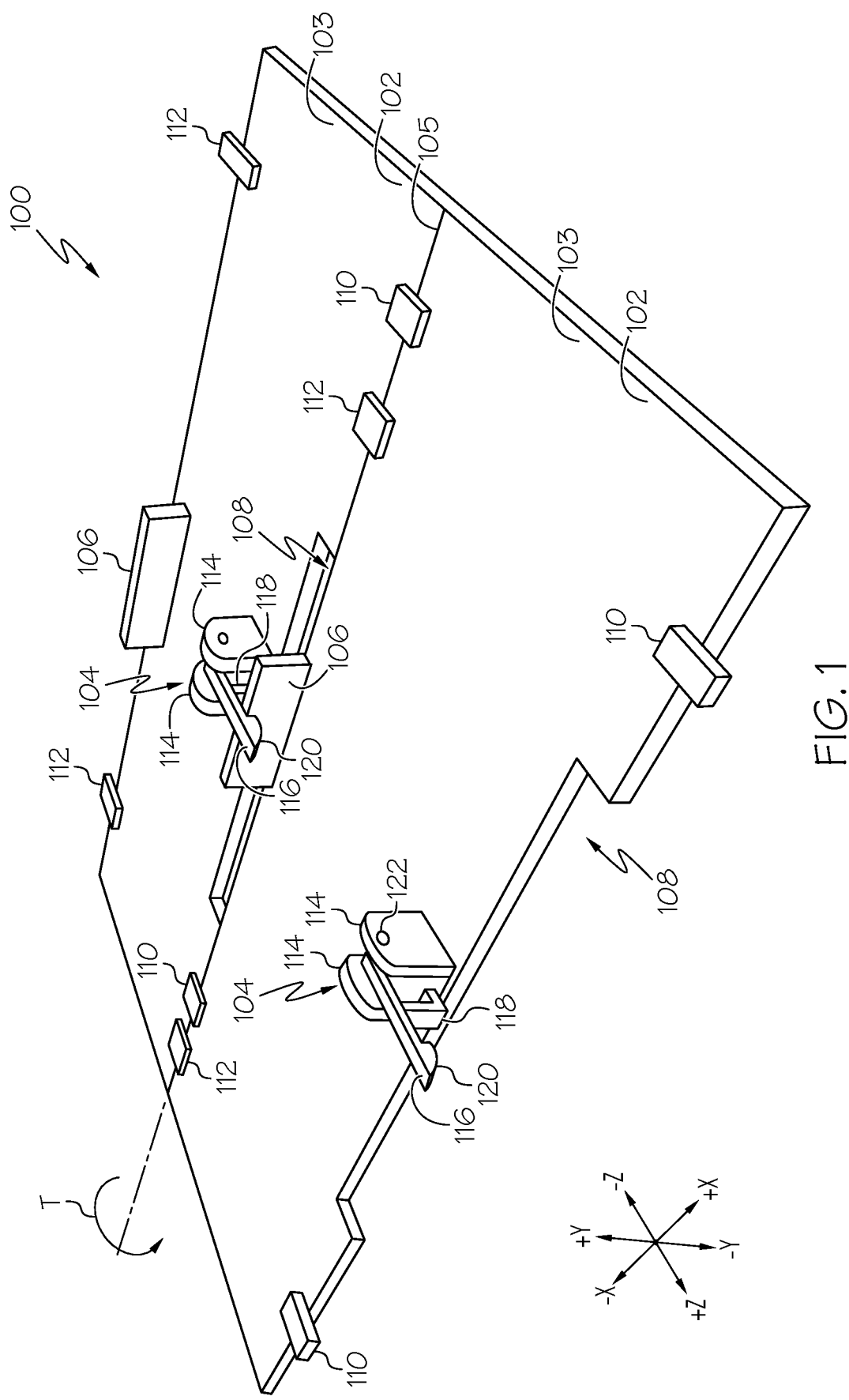
FIG. 1 schematically depicts a transfer cassette assembly including two transfer cassettes, according to one or more embodiments shown or described herein.

An embodiment of a transfer cassette may generally include a base plate, an interlock assembly, a securement plate, and a plate tab. The interlock assembly may be located at a first edge of the base plate and may include a support arranged on the base plate and a locking finger rotatably connected to the support. As will be described in greater detail herein, the interlock assembly may be used to secure the transfer cassette to another transfer cassette by having the locking finger engage with a securement plate of the another transfer cassette. The securement plate may be located at a second edge of the base plate, opposite the first edge and the interlock assembly. The plate tab may be partially secured to and extend from the base plate. Accordingly, the plate tab further assists to inhibit rotation of the transfer cassettes during a transfer between conveyors or a conveyor and a dolly by linking the two transfer cassettes together. An actuator may be used to separate multiple transfer cassettes by abutting the locking finger of the interlock assembly to disengage the locking finger from the securement plate. Various embodiments of the transfer cassette assembly will be described in greater detail herein.

As used herein, the term "longitudinal direction" refers to the forward-rearward direction in the +/−X-direction of the depicted coordinate axes. The term "lateral direction" refers to the +/−Z-direction of the depicted coordinate axes, and is transverse to the longitudinal direction. The term "vertical direction" refers to the upward-downward direction in the +/−Y-direction of the depicted coordinate axes. As used herein, "upper" and "above" are defined as the positive Y direction of the coordinate axis shown in the drawings. "Lower" and "below" are defined as the negative Y direction of the coordinate axis shown in the drawings.

Referring now to FIG. 1, an embodiment of a transfer cassette assembly 100 is generally depicted. As illustrated, the transfer cassette assembly 100 may include multiple transfer cassettes 102 secured to one another, abutting each other along a meeting line 105. Each transfer cassette 102 may generally include a base plate 103, an interlock assembly 104, a securement plate 106, and plate tabs 110, 112. The base plate 103 may include a cut-out 108, which is arranged on a longitudinal edge of the base plate 103 in the +/−X-direction. The cut-out 108 may be a slot as illustrated, but can also be a through-bore without departing from the scope of the present disclosure. The interlock assembly 104 may include supports 114, locking finger 116, bracket 118, lip 120, and bolt 122. The supports 114 are arranged on the base plate 103 in a spaced apart configuration in the +/−X-direction. The locking finger 116 may be rotatably secured to the supports 114 via bolt 122 at an end of the locking finger 116. The lip 120 may be arranged at the opposite end of the locking finger 116 from the supports 114, and extends downward from the locking finger 116 in the +/−Y-direction. The bracket 118 may extend from the locking finger 116 in the +/−Y-direction, and may also extend in the +/−Z-direction to rest on the base plate 103 and vertically support the locking finger 116 when the locking finger 116 is disengaged from a securement plate 106. In some embodiments, the bracket 118 is arranged to extend in the +/−Z-direction in order to rest on the supports 114 and vertically support the locking finger 116 when the locking finger 116 is disengaged from a securement plate 106.

Referring still to FIG. 1, plate tabs 110, 112 may be used to further secure transfer cassettes 102 of the transfer cassette assembly 100 together and inhibit rotation of the transfer cassettes 102 relative to one another. More specifically, the plate tabs 110, 112 may be arranged to prevent rotation of a transfer cassette 102 when a torque T is placed on the transfer cassette assembly 100 (e.g., due to gravity). The plate tabs 110 may be located at the edge of the base plate 103 that includes the interlock assembly 104. Additionally, the plate tabs 112 may be located at the edge of the base plate 103 that includes the securement plate 106. The plate tabs 110, 112 extend from the base plate 103 which the plates tabs 110, 112 are secured to in the +/−Z-direction in order to be arranged over a transfer cassette 102 which is arranged adjacent to the transfer cassette 102 which the plate tabs 110, 112 are secured to. This overlapping arrangement of the plate tabs 110, 112 helps inhibit rotation of the transfer cassettes 102 due to the torque T. The plate tabs 110 may be offset from the plate tabs 112 in the +/−X-direction. In addition, the plate tabs 110, 112 may be vertically spaced off the base plate 103 in the +Y-direction by shims or spacers (not shown) in order to provide additional space for the mating of multiple transfer cassettes 102 to one another.

It is noted that the transfer cassettes 102 and/or various components thereof may be made from a variety of materials. For example, in one non-limiting embodiment transfer cassettes 102 are made from steel plates (e.g., 0.5 in. steel plate). In some embodiments, the transfer cassettes 102, including all components such as the interlock assembly 104, the securement plate 106, and the plate tabs 110, 112, are made from an integral piece of rigid material, or several pieces welded or otherwise connected together.

Figure 2A:
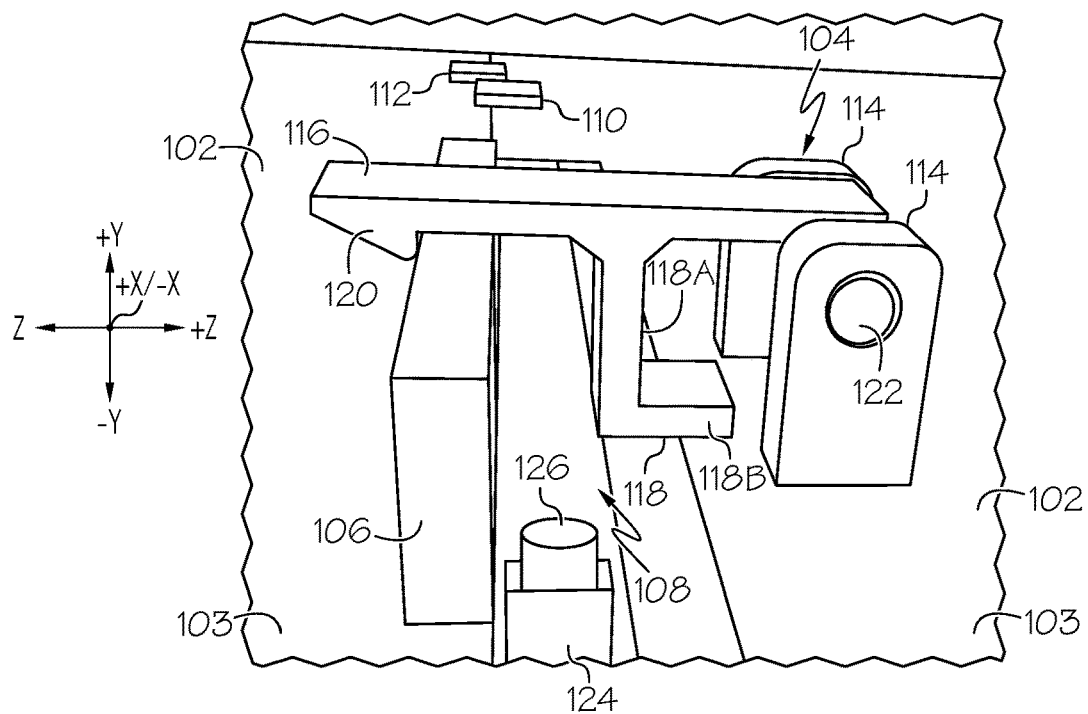
FIG. 2A schematically depicts a close-up view of an interlock assembly of the transfer cassette assembly of FIG. 1 in a locked position, as viewed along the +/−X-axis of the depicted coordinate axes, according to one or more embodiments shown or described herein.
Figure 2B:
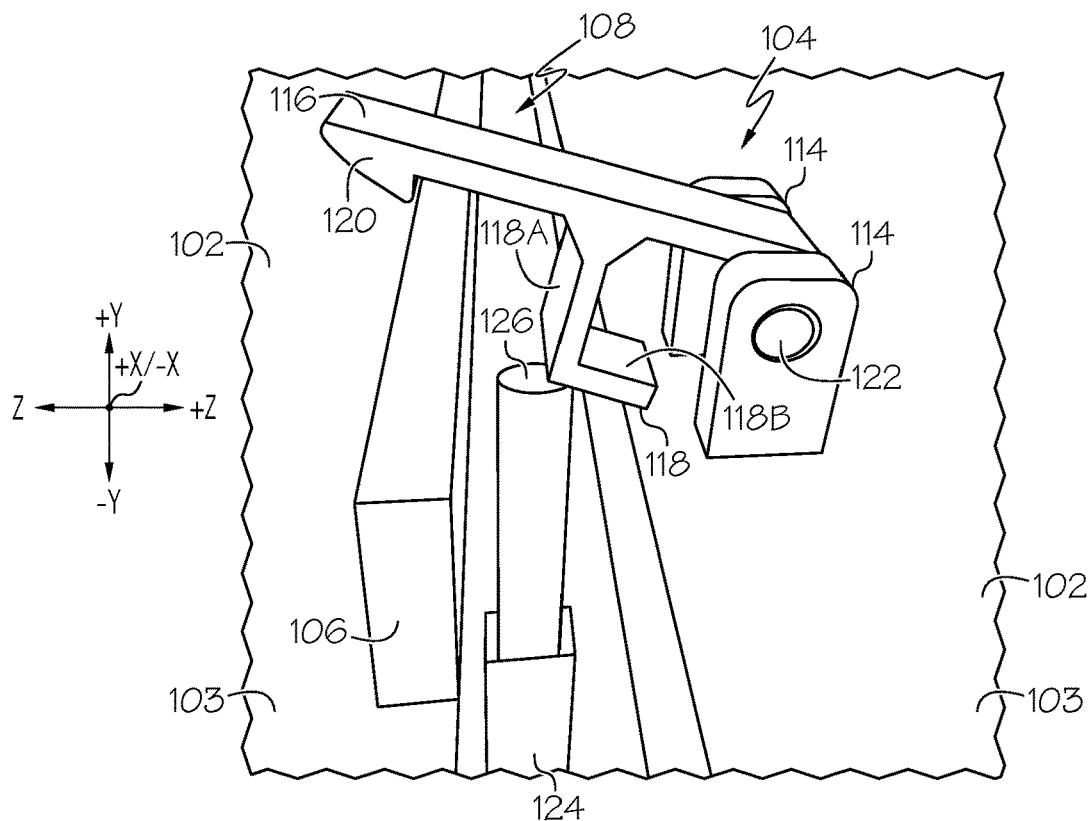
FIG. 2B schematically depicts a close-up view of an interlock assembly of the transfer cassette assembly of FIG. 1 in an unlocked position, as viewed along the +/−X-axis of the depicted coordinate axes, according to one or more embodiments shown or described herein.

Referring now to the FIGS. 2A and 2B, the locking finger 116 of the interlock assembly 104 extends in the +/−Z-direction in order to engage with a securement plate 106 of a different transfer cassette 102 arranged adjacent to the transfer cassette 102. As stated above, the lip 120 extends downward from the locking finger 116 in order to engage with the securement plate 106. The locking finger 116 may be held in the engaged state by gravity or a rotational force applied to the locking finger 116 by an external source. As illustrated, the locking finger 116 extends over the cut-out 108 in order to engage with the securement plate 106. This arrangement allows for an actuator 124 having a piston 126 to be arranged underneath a conveyor 128 (shown in FIG. 3B) which the transfer cassettes 102 are resting on. In some embodiments, the bracket 118 secured to the locking finger 116 may include a vertical member 118A extending in the +/−Y-direction, and a lateral member 118B extending in the +/−Z-direction. The abutment of the lateral member 118B against the base plate 103 keeps the locking finger 116 in a substantially horizontal position, as illustrated in FIG. 1, so that additional transfer cassettes 102 can be added to the transfer cassette assembly 100 by abutting a securement plate 106 of a transfer cassette 102 against the interlock assembly 104 of another transfer cassette 102. The shape and vertical position of the locking finger 116 and lip 120 when supported by the bracket 118 allows the locking finger 116 to automatically slide over an approaching securement plate 106 and interlock therewith.

Still referring to FIGS. 2A and 2B, in order to disengage the locking finger 116 from the securement plate 106, the actuator 124 extends the piston 126 vertically upward in the +/−Y-direction. The piston 126 then abuts the lateral member 118B of the bracket 118. After the initial contact by the piston 126 with the lateral member 118B, the piston 126 further extends in the vertical direction in order to apply a rotational force to the locking finger 116, thereby rotating the locking finger 116 about the bolt 122, disengaging the lip 120 form the securement plate 106. After the locking finger 116 is disengaged from the securement plate 106, the transfer cassette 102 having the securement plate 106 may move in the +/−Z-direction, with the transfer cassette 102 having the interlock assembly 104 remaining stationary. Once the transfer cassette 102 is disengaged, the piston 126 can be retracted in the vertical direction, thereby lowering the locking finger 116. As the locking finger 116 is lowered and rotated downward, the lateral member 118B will abut the base plate 103 in order to keep the locking finger 116 in a substantially horizontal position in order to engage with an adjacent transfer cassette 102. In some embodiments, the lateral member 118B is arranged to abut the supports 114 in order to keep the locking finger 116 in a substantially horizontal position.

In some embodiments, the actuator 124 can be a hydraulic, pneumatic, or electrical actuator. Additionally, during the disengaging of adjacent transfer cassettes 102, the transfer cassettes 102 may be stationary or moving. In an embodiment where the transfer cassettes 102 are moving while being disengaged from one another, the actuator 124 may move a short distance in the +/−Z-direction at the same speed as the transfer cassettes 102 while also extending the piston 126 in the +/−Y-direction. Additionally, actuator 124 may be stationary as the transfer cassettes 102 move above the actuator 124, with the piston 126 extending and retracting within the cut-out 108 as the cut-out 108 passes over the actuator 124.

Figure 3A:
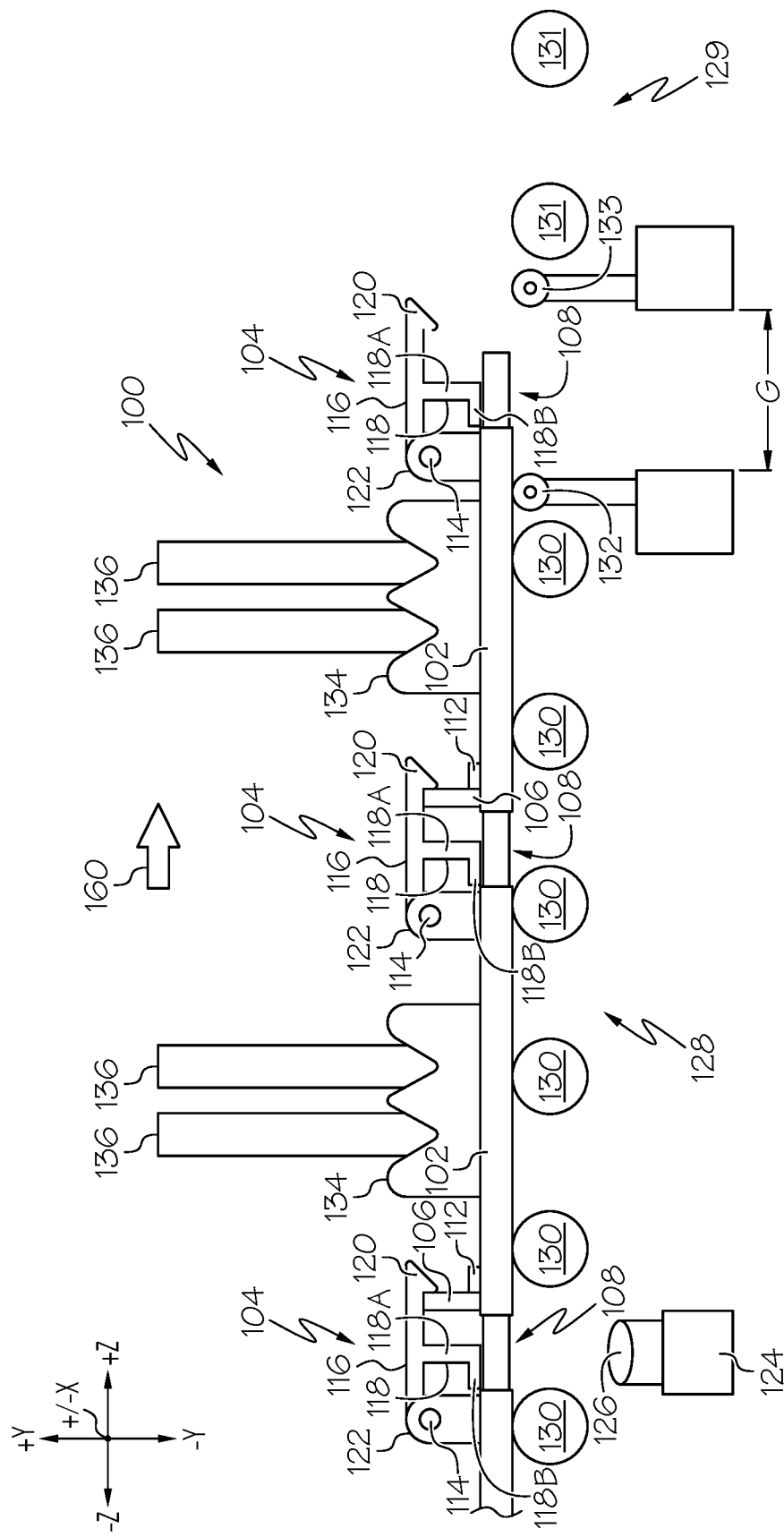
FIG. 3A schematically depicts a cross-sectional view of a system of the transfer cassette assembly of FIG. 1 as viewed along the +/−X-axis of the depicted coordinate axes, according to one or more embodiments shown or described herein.
Figure 3B:
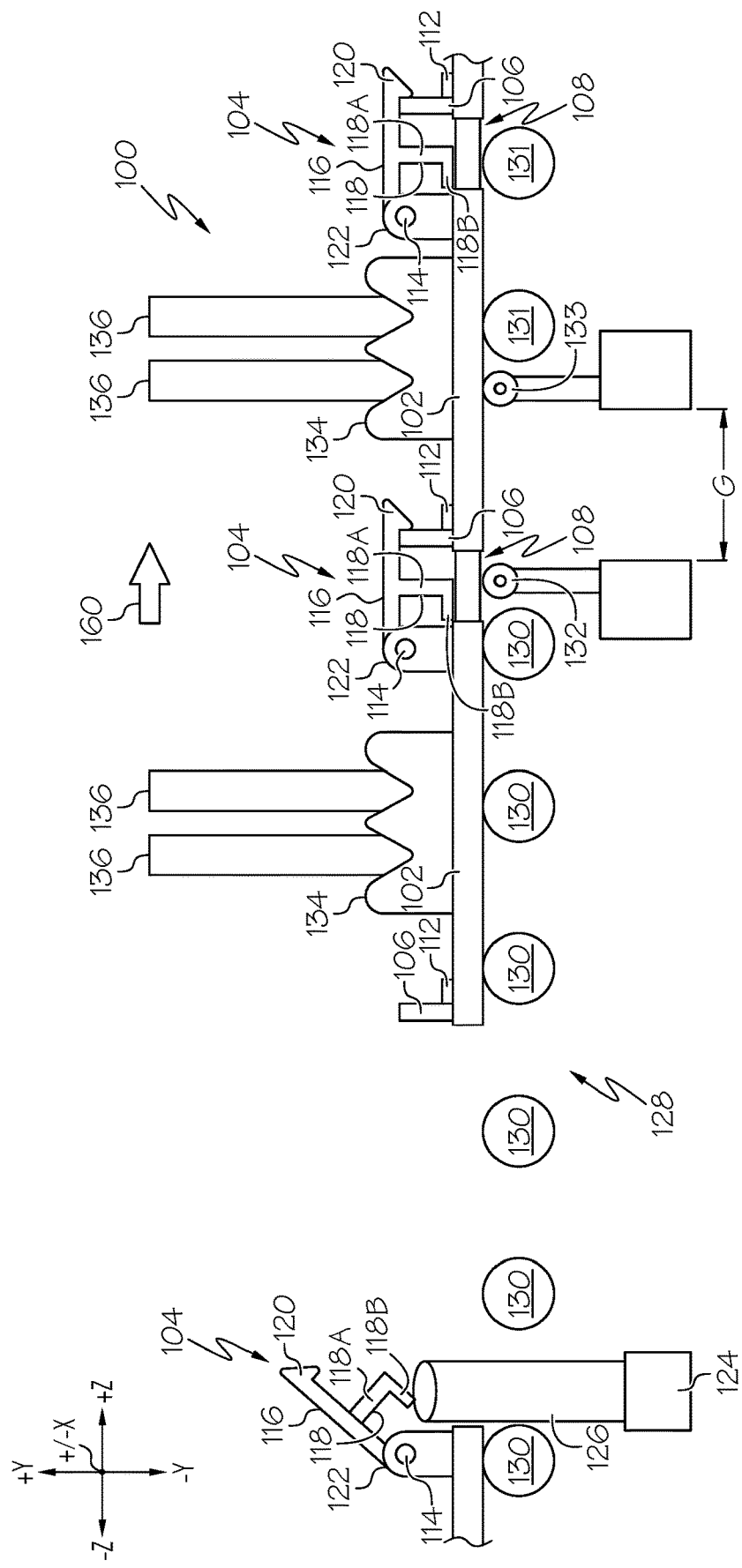
FIG. 3B schematically depicts a cross-sectional view of a system of the transfer cassette assembly of FIG. 1 as viewed along the +/−X-axis of the depicted coordinate axes, according to one or more embodiments shown or described herein.

Referring now to FIGS. 3A and 3B, the transfer cassettes 102 of the transfer cassette assembly 100 may be arranged on a conveyor 128 having motorized rollers 130 in order to propel the transfer cassettes 102 in the direction of travel 160 along the +/−Z-direction towards a dolly 129. The dolly 129 may include motorized rollers 131 to help aid in pulling the transfer cassette assembly 100 onto the dolly from the conveyor 128. When the dolly 129 is arranged adjacent to the conveyor 128, a gap G is formed between the conveyor 128 and the dolly 129. Additionally, holders 134 may be secured on the base plates 103 of the transfer cassettes 102 or integral with the base plates 103. The holders 134 may hold components 136, such as vehicle doors or body panels. As stated above, it may be required to separate a single transfer cassette 102 from the transfer cassette assembly 100 while the transfer cassette assembly 100 rests on motorized roller 130. In order to separate a transfer cassette 102 from the transfer cassette assembly 100, the transfer cassette 102 to be separated is arranged over the actuator 124. The motorized rollers 130 can be driven to propel the transfer cassette assembly 100 over the actuator 124, with the actuator being arranged between motorized rollers 130. In some embodiments, the conveyor 128 includes non-driven wheel 132 arranged on the end of the conveyor 128 in order to provide support to the transfer cassette assembly 100 as a transfer cassette 102 passes over the gap G. Additionally, the dolly 129 may include a non-driven wheel 133 arranged on the end of the dolly 129 in order to support a transfer cassette 102 passing over the gap G. Once the cut-out 108 is arranged over the actuator 124, the piston 126 is extended in the vertical direction to abut the lateral member 118B of the bracket 118 in order to rotate the locking finger 116 to disengage the lip 120 from the securement plate 106. The disengaged transfer cassette 102 may then be moved by motorized rollers 130 in the direction of travel 160 away from the transfer cassette assembly 100. In some embodiments, the piston 126 can act as a stopper to prevent additional transfer cassettes 102 from moving in the direction of travel 160.

Due to the connected nature of the transfer cassettes 102 in the transfer cassette assembly 100 via the interaction between the interlock assemblies 104 and the securement plates 106, the transfer cassettes 102 moving over the non-driven wheels 132 and 133 will not stall within the gap G since the transfer cassette assembly 100 will always be engaged with a motorized roller 130 of the conveyor 128 and/or a motorized roller 131 of the dolly during the transfer. The transfer cassette 102 arranged over the non-driven wheels 132 and 133 may be pushed or pulled over the non-driven wheels 132 and 133 and the gap G by adjacent transfer cassettes 102 in the transfer cassette assembly 100 engaged with motorized rollers 130 and 131. Additionally, plate tabs 110, 112 are arranged to prevent the rotation due to gravity of a transfer cassette 102, which passes over the gap G formed between the non-driven wheels 132 and 133. The gap G formed between the non-driven wheels 132 and 133 may be formed due to the dolly 129 meeting the conveyor 128 to collect a certain amount of transfer cassettes 102 from the transfer cassette assembly 100. Additionally, it is important to note that the arrangement of the transfer cassette assembly 100 not only prevent rotation due to gravity, but also accounts for misalignment of the transfer cassettes 102 due to friction along the conveyor 128 during the assembly process.

It should now be understood that embodiments described herein are directed to a transfer cassette including a base plate, an interlock assembly, a securement plate, and a plate tab. The interlock assembly is arranged on a first edge of the base plate and includes a support arranged on the base plate and a locking finger rotatably arranged on the support. The interlock assembly is used to secure the transfer cassette to multiple transfer cassettes by having the locking finger engage with a securement plate of another transfer cassette. The securement plate is arranged on a second edge of the base plate, opposite the first edge and the interlock assembly. The plate tab is partially secured to and extending from the base plate. Accordingly, the plate tab helps prevent rotation of the transfer cassette during a transfer. Furthermore, an actuator may be used to separate multiple transfer cassettes by abutting the locking finger of an interlock assembly to disengage the locking finger from the securement plate.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A transfer cassette, comprising:
a base plate;
an interlock assembly located at a first edge of the base plate, the interlock assembly comprising:
a support on the base plate; and
a locking finger rotatably connected to the support;
a securement plate on a second edge of the base plate, opposite the first edge and configured to engage another interlock assembly of an adjacent transfer cassette; and
a plate tab located outboard of the interlock assembly that extends outward beyond the first edge of the base plate to overhang and engage a broad surface of an adjacent base plate of the adjacent transfer cassette.

2. The transfer cassette of claim 1, further comprising a cut-out located at the first edge of the base plate, wherein the locking finger is extends over the cut-out.

3. The transfer cassette of claim 2, wherein a bracket is on the locking finger and adjacent the cut-out.

4. The transfer cassette of claim 3, wherein the securement plate is located to engage with a second locking finger, having a second bracket, of a second transfer cassette.

5. The transfer cassette of claim 4, wherein the plate tab is located to extend over the second transfer cassette to prevent rotation of the second transfer cassette relative to the first transfer cassette.

6. A transfer cassette assembly, comprising:
a first transfer cassette, comprising:
a first base plate;
a first interlock assembly located at a first edge of the first base plate and adjacent to a first cut-out of the first base plate, comprising:
a first support on the first base plate; and
a first locking finger rotatably connected to the first support;
a first securement plate arranged on the first base plate, opposite the first edge; and a first plate tab located outboard of the first interlock assembly that extends outward beyond the first edge of the first base plate; and a second transfer cassette, comprising:
  a second base plate;
  a second interlock assembly adjacent to a second cut-out of the second base plate, comprising:
    a second support on the second base plate; and
    a second locking finger rotatably connected to the second support;
  a second securement plate on the second base plate,
wherein, the first transfer cassette is arranged adjacent to the second transfer cassette, and the first locking finger engages with the second securement plate to couple the first transfer cassette to the second transfer cassette,
wherein, the first plate tab overhangs and engages a broad surface of the second base plate.

7. The transfer cassette assembly of claim 6, further comprising:
  the first plate tab partially secured to and extending outward beyond the first base plate; and
  a second plate tab partially secured to and extending outward beyond the second base plate,
  wherein, the first plate tab extends over the second base plate, and the second plate tab extends over the first base plate.

8. The transfer cassette assembly of claim 7, wherein the first plate tab and the second plate tab support the first and second transfer cassettes as the first and second transfer cassettes pass over a gap.

9. The transfer cassette assembly of claim 6, further comprising:
  a first bracket on the first locking finger and located adjacent the first cut-out; and
  a second bracket on the second locking finger located adjacent the second cut-out.

10. The transfer cassette assembly of claim 9, wherein the first bracket retains the first locking finger in a horizontal position by abutting the first base plate.

11. A conveyor system comprising:
a conveyor; and
a transfer cassette assembly resting on the conveyor, the transfer cassette assembly comprising:
  a first transfer cassette, comprising:
    a first base plate having a first cut-out;
    a first interlock assembly located at a first edge of the first base plate and adjacent to the first cut-out of the first base plate, comprising:
      a first support on the first base plate; and
      a first locking finger rotatably connected to the first support;
    a first securement plate arranged on the first base plate; and
    a plate tab located outboard of the first interlock assembly that extends outward beyond the first edge of the first base plate; and
  a second transfer cassette, comprising:
    a second base plate having a second cut-out;
    a second interlock assembly adjacent to the second cut-out of the second base plate, comprising:
      a second support on the second base plate; and
      a second locking finger rotatably connected to the second support;
    a second securement plate on the second base plate,
  wherein, the first transfer cassette is arranged adjacent to the second transfer cassette, and the first locking finger engages with the second securement plate to couple the first transfer cassette to the second transfer cassette,
  wherein, the plate tab overhangs and engages a broad surface of the second base plate.

12. The conveyor system of claim 11, further comprising an actuator operatively arranged to pass through the first cut-out to abut a first bracket arranged on the first locking finger.

13. The conveyor system of claim 12, wherein the first locking finger disengages from the second securement plate when the actuator abuts the first bracket of the first locking finger.

* * * * *